United States Patent
Ignaczak et al.

(10) Patent No.: US 9,409,475 B2
(45) Date of Patent: Aug. 9, 2016

(54) FUEL LINE CONNECTOR ASSEMBLY

(71) Applicant: Norma U.S. Holding LLC, Auburn Hills, MI (US)

(72) Inventors: Brian T. Ignaczak, Rochester, MI (US); Brian T. Geese, Lake Orion, MI (US); Craig Alan Stapleton, Saint Clair, MI (US); Douglas Milton Fansler, Saint Clair, MI (US)

(73) Assignee: Norma U.S. Holding LLC, Auburn, MI (US)

( * ) Notice: Subject to any disclaimer, the term of this patent is extended or adjusted under 35 U.S.C. 154(b) by 146 days.

(21) Appl. No.: 14/174,925

(22) Filed: Feb. 7, 2014

(65) Prior Publication Data

US 2014/0225366 A1    Aug. 14, 2014

Related U.S. Application Data

(60) Provisional application No. 61/762,623, filed on Feb. 8, 2013.

(51) Int. Cl.
*F16L 37/00*   (2006.01)
*B60K 15/01*   (2006.01)
*F16L 37/05*   (2006.01)

(52) U.S. Cl.
CPC *B60K 15/01* (2013.01); *F16L 37/05* (2013.01)

(58) Field of Classification Search
USPC .......... 285/313, 308, 309, 310, 82, 84, 85, 86
See application file for complete search history.

(56) References Cited

U.S. PATENT DOCUMENTS 2,888,278 A * 5/1959 Torres ................. F16L 37/127
                                                          285/313
3,191,972 A * 6/1965 Collar ................. F16L 37/101
                                                          137/614.04

(Continued)

FOREIGN PATENT DOCUMENTS

| JP | 2001090889 A | 4/2001 |
| JP | 2007085471 A | 4/2007 |
| JP | 2007132473 A | 5/2007 |

OTHER PUBLICATIONS

International Search Report for application No. PCT/US2014/015348, dated Nov. 25, 2014, 3 pages.

(Continued)

*Primary Examiner* — Aaron Dunwoody
(74) *Attorney, Agent, or Firm* — Harness, Dickey & Pierce, P.L.C.

(57) ABSTRACT

A fuel line connector assembly that includes a connector, collar, and insert. The connector has a first interconnector, and the collar has a second interconnector and is constructed for attachment to a conduit of a fuel line assembly. The connector, collar, and insert are connectable together such that the first interconnector of the connector and the second interconnector of the collar engage each other along a generally axial direction and secure the connector and collar together. The insert has a keeper and, upon circumferential rotation of the insert, the keeper interacts with the first and second interconnectors and holds their engagement and maintains securement between the connector and collar. A cover having one or more actuating buttons fits over the collar and insert to enable disengagement of the insert and collar so the insert can be rotated to permit disconnection of the collar from the connector.

10 Claims, 5 Drawing Sheets

(56) References Cited

U.S. PATENT DOCUMENTS

| | | | | |
|---|---|---|---|---|
| 4,632,437 | A * | 12/1986 | Robson | F16L 37/101 285/243 |
| 5,505,495 | A | 4/1996 | Godeau | |
| 5,707,340 | A * | 1/1998 | Hipp | A61B 1/00195 285/314 |
| 6,637,780 | B2 * | 10/2003 | Miyajima | F16L 37/0985 285/305 |
| 8,181,997 | B2 * | 5/2012 | Wang | F16L 33/223 285/24 |
| 8,366,154 | B2 * | 2/2013 | Wang | F16L 37/0985 285/314 |
| 2005/0217265 | A1 | 10/2005 | Popp et al. | |
| 2006/0152005 | A1 | 7/2006 | Kertesz et al. | |
| 2009/0322076 | A1 * | 12/2009 | Tiberghien | F16L 37/248 285/313 |
| 2010/0225108 | A1 | 9/2010 | Mann | |
| 2012/0086197 | A1 | 4/2012 | Bauer et al. | |
| 2013/0008539 | A1 | 1/2013 | Kanno et al. | |
| 2013/0015656 | A1 * | 1/2013 | Ehrke | F16L 37/113 285/316 |

OTHER PUBLICATIONS

Written Opinion for application No. PCT/US2014/015348, dated Nov. 25, 2014, 5 pages.

* cited by examiner

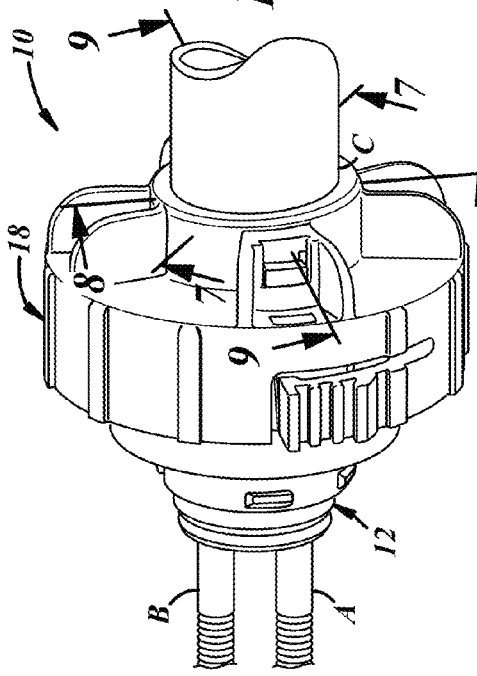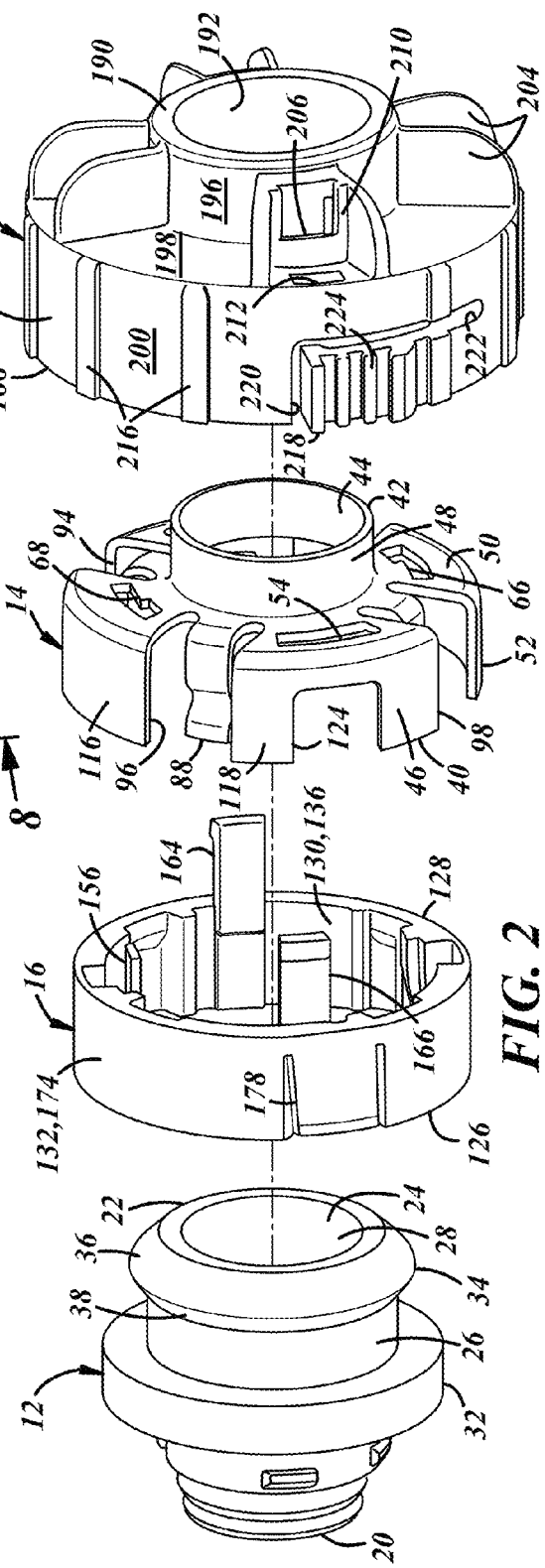

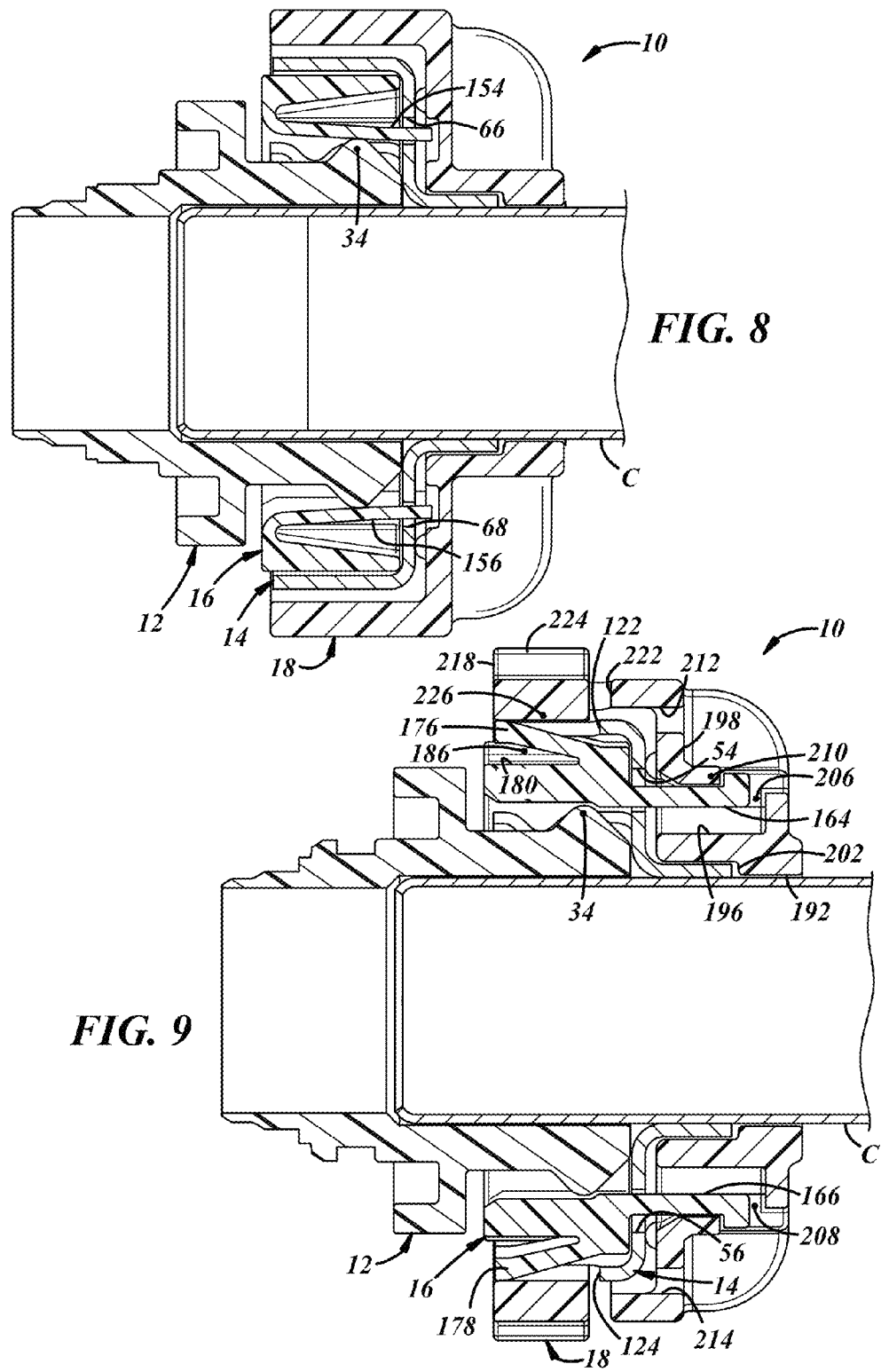

FUEL LINE CONNECTOR ASSEMBLY

CROSS-REFERENCE TO RELATED APPLICATION

This application claims the benefit of U.S. Provisional Application No. 61/762,623 filed Feb. 8, 2013, the entire contents of which is hereby incorporated by reference.

TECHNICAL FIELD

The present disclosure relates to joining fuel lines together using connector assemblies.

BACKGROUND

In fuel systems, such as those equipped in automotive engine intake and exhaust assemblies, connectors are often used to join fuel lines together for transporting liquid fuel, vapor fuel, or both liquid and vapor fuel among system components like engines and fuel tank assemblies. To be effective, a connection should provide good resistance against axial separation of the fuel lines.

SUMMARY

In accordance with one embodiment of the invention, there is provided a fuel line connector assembly that includes a connector, collar, and insert. The connector has a first interconnector, and the collar has a second interconnector and is constructed for attachment to a conduit of a fuel line assembly. The connector, collar, and insert are connectable together such that the first interconnector of the connector and the second interconnector of the collar engage each other along a generally axial direction and secure the connector and collar together. The insert has a keeper and, upon circumferential rotation of the insert, the keeper interacts with the first and second interconnectors and holds their engagement and maintains securement between the connector and collar.

More specific embodiments of this fuel line connector assembly may have one or more of the following additional features:

The first interconnector can be a flange and the second interconnector can be a tang, with the tang and flange making surface-to-surface abutment when engaged and secured.

The keeper can be a bulged portion extending radially-inwardly from a wall of the insert, and the bulged portion can abut the second interconnector of the collar upon their interaction.

The fuel line connector assembly can include a cover having a third interconnector with the collar having a slot with a step located in an edge of the slot, and the insert can have a fourth interconnector and a projection. When the insert and cover are brought together along the generally axial direction, the third and fourth interconnectors engage each other and join rotational movement of the insert and cover, with the projection of the insert being inserted through the slot of the collar. Engagement between the projection and step of the slot then precludes circumferential rotation of the insert and cover. This embodiment can be arranged such that engagement between the first interconnector of the connector and the projection of the insert permits movement of the projection past the step while not precluding circumferential rotation of the insert and cover.

In accordance with another embodiment of the invention, there is provided a fuel line connector assembly that includes a connector having a first interconnector, a collar having a second interconnector and a slot located in a wall of the collar, and an insert having a projection. The connector, collar, and insert are connectable together along a generally axial direction such that the first and second interconnectors interact to secure the connector and collar together. When the insert is at a first circumferential orientation relative to the collar and is brought into engagement with the collar along the generally axial direction, the projection is inserted through the slot at a first section of the slot, and upon rotation of the insert to a second circumferential orientation relative to the collar, the projection is moved to a second section of the slot.

In accordance with another embodiment of the invention, there is provided a fuel line connector assembly that includes a collar, insert, and cover. The collar is constructed for attachment to a conduit of a fuel line assembly, and has a slot located in a wall as well as a recess. The insert has a projection, a first interconnector, and a tab. The cover has a second interconnector and an actuator. With the insert being at a first circumferential orientation relative to the collar, then when the collar, insert, and cover are brought together along a generally axial direction: i) the projection is inserted through the slot of the collar, and ii) the first and interconnectors engage each other. When the cover is thereafter rotated to a second circumferential orientation relative to the collar, the insert co-rotates with the cover to the second circumferential orientation via engagement between the first and second interconnectors. With the insert and cover being at the second circumferential orientation, the tab of the insert is received in the recess of the collar and the insert is inhibited from circumferential rotation away from the second circumferential orientation. In order to bring the insert and cover out of the second circumferential orientation, the actuator of the cover may be actuated so as to move the tab of the insert out of the recess of the collar. In at least some more specific embodiments the first interconnector of the insert is an extension and the second interconnector of the cover is an opening, with the extension being insertable into the opening upon their engagement.

In accordance with yet another embodiment of the invention, there is provided a fuel line connector assembly that includes a connector having a flange, a collar constructed for attachment to a conduit of a fuel line assembly, and insert, and a cover. The collar has a tang, a first wall with a slot located therein, and a second wall with a recess located therein. The insert has an extension, a bulged portion, and a tab. And the cover has an opening and an actuator. When the connector, collar, insert, and cover are brought together along a generally axial direction: i) the flange and tang engage each other and secure the connector and collar together, ii) the extension is inserted through the slot of the collar, and iii) the extension is received in the opening of the cover. When the cover is then circumferentially rotated: i) the insert co-rotates with the cover via reception of the extension in the opening, ii) the bulged portion of the insert abuts the tang of the collar and holds its engagement with the flange and inhibits axial separation of the collar and connector away from each other, and iii) the tab is received in the recess of the collar and the insert and collar are inhibited from further circumferential rotation relative to each other. And, wherein, in order to permit further circumferential rotation of the cover and insert, the actuator of the cover can be actuated to move the tab out of the recess of the collar. In at least some more specific embodiments the collar has a second slot located in the first wall and the insert has a projection, and when the collar and the insert are brought together generally axially before circumferential rotation of the cover, the projection is inserted through the second slot at a first section of the second slot and the insert is set at a circumferential orientation relative to the collar that facilitates engagement between the flange and the tang free of abutment with the bulged portion. When the connector and the insert are brought together generally axially, the flange and the projection engage each other and movement of the projection from the first section of the second slot is facilitated via the engagement, and wherein, upon circumferential rotation of the cover, the projection is moved to a second section of the second slot.

Embodiments of the invention may include any technically feasible combination of the various connector assembly features shown or described herein.

BRIEF DESCRIPTION OF THE DRAWINGS

One or more preferred exemplary embodiments of the invention will hereinafter be described in conjunction with the appended drawings, wherein like designations denote like elements, and wherein:

FIG. 1 is a perspective view of an embodiment of a fuel line connector assembly, showing components of the fuel line connector assembly assembled together;

FIG. 2 is an exploded view, shown in perspective, of the components of the fuel line connector assembly of FIG. 1;

FIG. 8 is a sectional view taken at arrows 8-8 in FIG. 1; and

FIG. 9 is a sectional view taken at arrows 9-9 in FIG. 1.

DETAILED DESCRIPTION OF THE PREFERRED EMBODIMENT(S)

Figure 3:
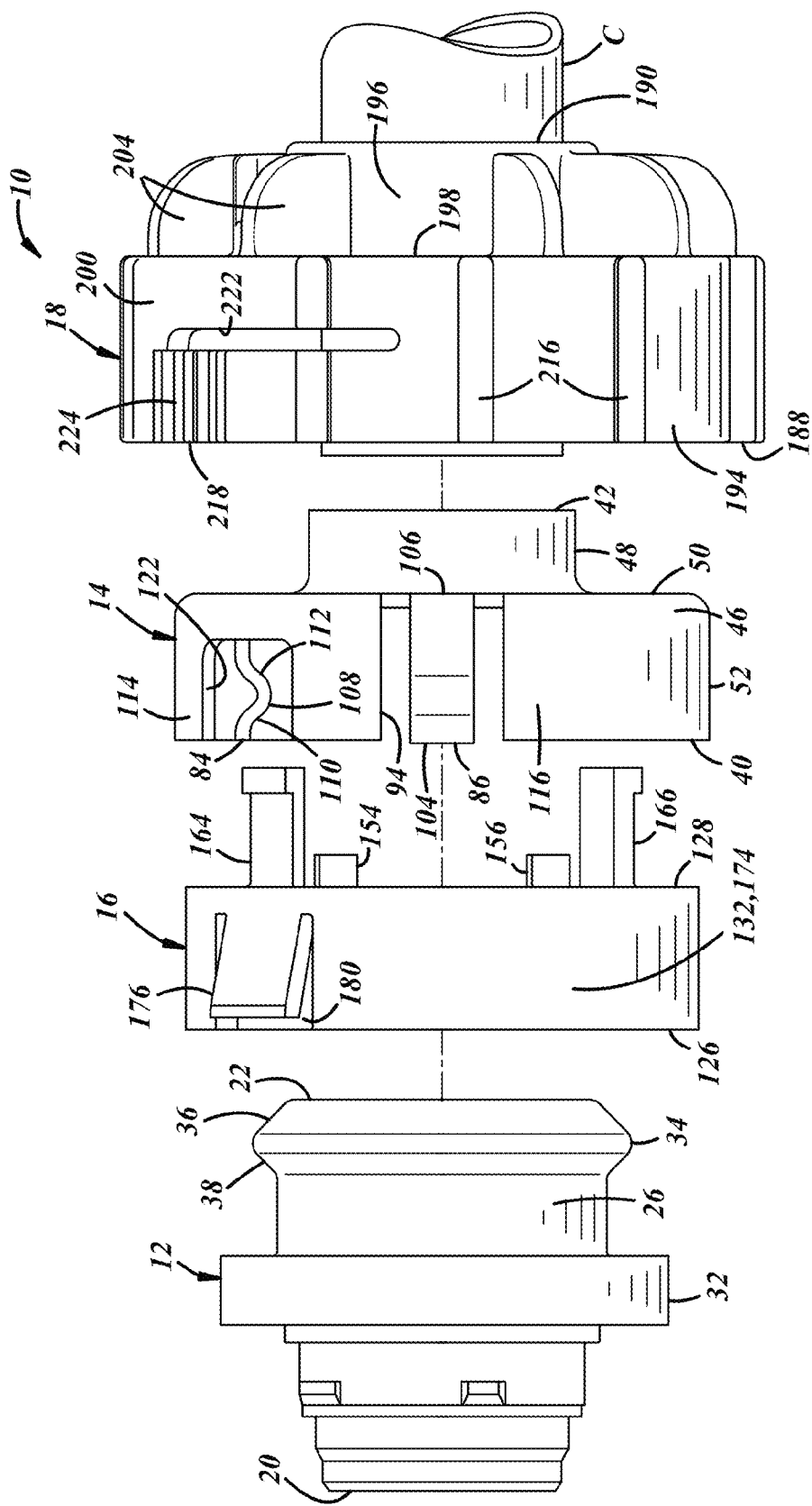
FIG. 3 is an exploded view, shown at a side, of the components of the fuel line connector assembly of FIG. 1.

Referring to the drawings, FIGS. 1-9 show an embodiment of a fuel line connector assembly 10 that is used to make a connection among fuel lines in, for example, automotive engine intake and exhaust assemblies and among engines and fuel tank assemblies. In a specific example, the fuel line connector assembly 10 is part of a fuel tank crossover assembly in which liquid and vapor fuel is transported between discrete fuel tanks and a corrugated crossover tube can be used with the fuel line connector assembly; other examples are possible including non-automotive applications such as marine and industrial equipment applications. In the embodiment shown, the fuel line connector assembly 10 helps ensure that the connection among its components, and potentially among accompanying fuel lines, is properly made by providing a notice and indication to the assembler. As an aside, and unless otherwise specified, the terms radially, axially, and circumferentially refer to directions with respect to the generally circular and cylindrical shape of the fuel line connector assembly 10 and its components, such that radially refers to a direction generally along and parallel to a radius of the shape, axially refers to a direction generally along and parallel to an axis of the shape, and circumferentially refers to a direction generally along a circumference of the shape.

In general, the fuel line connector assembly 10 can have different designs, constructions, and components to make a connection that holds together a first liquid fuel line A and a second liquid fuel line (not shown), and that holds together a first vapor fuel line B and a second vapor fuel line (not shown). Referring to FIGS. 2 and 3, in this embodiment the fuel line connector assembly 10 is a multi-piece assembly and includes a connector 12, a collar 14, an insert 16, and a cover 18. In other embodiments, not all of these components need to be provided, and more, less, or different components could be provided for the fuel line connector assembly 10 while still performing at least some of the functionalities and accomplishing at least some of the capabilities described herein.

The connector 12 is constructed to fit with one or more discrete components such as a fitting that itself carries the first liquid and vapor fuel lines A, B. The connector 12 can have different designs and constructions, including that shown by the embodiment of FIGS. 2, 3, and 7. Here, the connector 12 has a one-piece and generally cylindrical body and serves in a sense as a spigot that is inserted into the other components of the fuel line connector assembly 10. The connector 12 can be composed of a plastic material such as those commonly referred to as Nylon 12 and Nylon 6, and can be made by an injection molding process. The one-piece body extends axially between a first axial end 20 and a second axial end 22, and on its radially-inwardly side has an inner surface 24 and on its radially-outwardly side has an outer surface 26. The inner surface 24 defines a passthrough 28 extending between the first axial end 20 and the second axial end 22 and that receives insertion of the fitting (if provided) and insertion of a metal conduit C. To facilitate placement of one or more optional seals such as o-rings, a step 30 can be located in the passthrough 28 about midway between the first and second axial ends 20, 22. The passthrough 28 has a first constant diameter section spanning from the first axial end 20 to the step 30, and has a second constant diameter section spanning from the second axial end 22 to the step. Again, one or more seals can be placed in either or both of the constant diameter sections.

At the outer surface 26, the connector 12 can have different portions for interactions with other components. A radially- and axially-extending skirt 32 can be provided for interaction with external components; for example, the skirt can be attached via hot plate welding to an associate fuel tank. Also, an interconnector in the form of a flange 34 is provided in the embodiment shown for interaction with the collar 14 and the insert 16. The flange 34 extends radially-outwardly relative to the immediately surrounding surface and is located near from the second axial end 22, but could be spaced farther away from the second axial end. The flange 34 extends circumferentially continuously around the connector 12, but could be discontinuous and made up of discrete flange segments. A first or leading surface 36 is sloped from the second axial end 22 to facilitate interaction with the collar 14 and the insert 16, and a second or trailing surface 38 is also sloped but in an opposite direction compared to the leading surface 36. The slope of the leading and trailing surfaces 36, 38 could be more or less than that show. Still, in other embodiments, the flange 34 could have a bead shape (more pronounced roundedness), a rib shape (less pronounced roundedness), a ramp shape (axially-directed trailing surface), or another shape—all of which and more are meant to be encompassed by the term interconnector and by the term flange.

The collar 14 is constructed to fit over the metal conduit C and to interact in different ways with the other components of the fuel line connector assembly 10. The collar 14 can have different designs and constructions, including that shown by the embodiment of FIGS. 2, 3, 4, and 7. Here, the collar 14 has a one-piece and generally cylindrical body. The collar 14 can be composed of a metal material such as stainless steel and can be made by a metalworking process, or can be composed of a plastic material and made by an injection molding process. The one-piece body extends axially between a first axial end 40 and a second axial end 42, and on its radially-inwardly facing side has an inner surface 44 and on its radially-outwardly facing side has an outer surface 46. In this embodiment the collar 14 has a first or axial wall 48, a second or radial wall 50, and a third or axial wall 52. The first wall 48 extends generally axially and defines a cylindrical section of the collar 14. For attachment to the metal conduit C, the first wall 48 can be brazed directly to an outer surface of the metal conduit via surface-to-surface contact therebetween, or can be attached in another way such as by welding.

Figure 4:
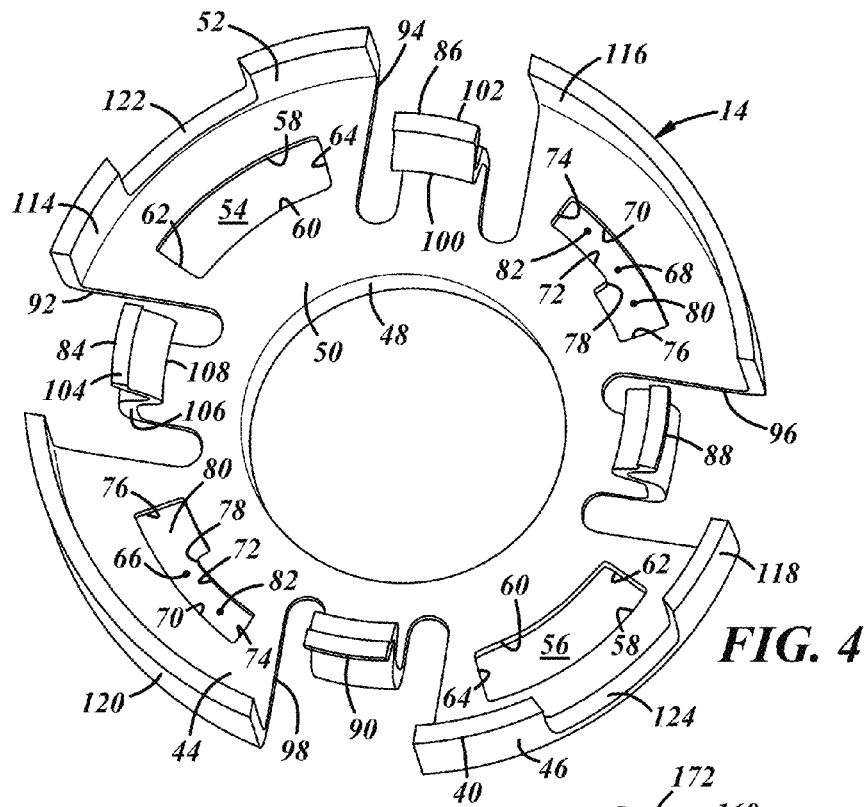
FIG. 4 is a perspective view of a collar component of the fuel line connector assembly of FIG. 1.

The second wall 50 extends generally radially, and depends generally radially and orthogonally from the first wall 48. In the embodiment of the figures, and as best shown in FIG. 4, several slots are located in the second wall 50 for receiving different parts of the insert 16. A first slot 54 and a second slot 56 are defined within the second wall 50, and are spaced around the circumference of the second wall approximately one-hundred-and-eighty degrees (180°) opposite each other. Both of the slots 54, 56 are enclosed and generally confined by an upper edge 58, a lower edge 60, a first side edge 62, and a second side edge 64. Though the slots 54, 56 have a generally arcuate shape, their edges are all mostly geometrically linear without any structural interruptions such as steps. Side-edge-to-side-edge, the first and second slot 54, 56 have a circumferential extent and length sufficient to accommodate the rotation of the insert 16 and the cover 18, as will be described in greater detail below.

Furthermore, a third slot 66 and a fourth slot 68 are also defined within the second wall 50, and are spaced around the circumference of the second wall approximately one-hundred-and-eighty degrees (180°) opposite each other. Like the slots 54, 56, both of the slots 66, 68 are enclosed and generally confined by an upper edge 70, a lower edge 72, a first side edge 74, and a second side edge 76. Though the slots 66, 68 have a generally arcuate shape, the lower edge 72 of each slot has a step 78 located therein and delineating a first section 80 and a second section 82. The second section 82 has a thinner width measured between the upper and lower edges 70, 72 than the first section.

In the embodiment of the figures, an interconnector of the collar 14 in the form of one or more tang(s) is provided at the second wall 50 for interaction and engagement with the flange 34 in order to establish a mechanical retention and securement therebetween. In other embodiments, the tang(s) could be provided at the first wall 48 or at the third wall 52. As shown best in FIG. 4, there are a total of four individual tangs spaced around the circumference of the second wall 50 approximately ninety degrees (90°) apart from one another—a first tang 84, a second tang 86, a third tang 88, and a fourth tang 90. Other quantities of tangs are possible including more or less than shown (e.g., eight, five, two, or one). Each tang is formed at a cutout of the collar 14 in the second and third walls 50, 52—a first cutout 92, a second cutout 94, a third cutout 96, and a fourth cutout 98. Each of the tangs 84, 86, 88, 90 extends generally axially, depends generally orthogonally to the second wall 50, and is generally axially co-extensive with the third wall 52. On the radially-inwardly facing side, each tang has an inner surface 100, and on the radially-outwardly facing side, each tang has an outer surface 102. Further, the tangs each have a distal or free end 104, and an opposite proximal or attachment end 106. To ease engagement with the flange 34 of the connector 12, the tangs are designed for slight radially-outward movement and flexing, but are resilient and hence rebound back to their original position after flexing. Between the distal and proximal ends 104, 106 and as shown best in FIGS. 3 and 7, each of the tangs 84, 86, 88, 90 has a catch in the form of a bight 108. Complementing those of the flange 34, though they need not, the bights 108 have a first or leading sloped surface 110 and a second or trailing sloped surface 112. Still, in other embodiments, the tang(s) could have a plank shape (geometrically linear) with a hooked end for interaction with the flange 34—this possibility and others are meant to be encompassed by the term interconnector and by the term tang.

Referring now to FIGS. 2, 3, and 4, the third wall 52 extends generally axially, and depends generally axially and orthogonally from the second wall 50. By way of the cutouts 92, 94, 96, and 98, the third wall 52 is partitioned into a first wall segment 114, a second wall segment 116, a third wall segment 118, and a fourth wall segment 120. Two of the wall segments, the first 114 and third 118, are windowed with a respective first recess 122 and a second recess 124. As shown in the figures, each of the recesses 122, 124 is defined by three edges and has an open side at the first axial end 40, but could be enclosed and generally confined by four edges similar to the slots of the second wall 50. The recesses 122, 124 are spaced around the circumference of the third wall 52 approximately one-hundred-and-eighty-degrees (180°) opposite each other.

The insert 16 is generally sandwiched among the other components of the fuel line connector assembly 10 and, in a sense, in this embodiment serves as a locking piece in the assembly. The insert 16 can have different designs and constructions, including that shown by the embodiment of FIGS. 2, 3, 5, and 6. Here, the insert 16 has a one-piece and generally annular body. The insert 16 can be composed of a plastic material such as those commonly referred to as Nylon 12 and Nylon 6, and can be made by an injection molding process. The one-piece body extends axially between a first axial end 126 and a second axial end 128, and on its radially-inwardly side has an inner surface 130 and on its radially-outwardly side has an outer surface 132. The inner surface 130 generally defines a passthrough 134 extending between the first and second axial ends 126, 128. The passthrough 134 provides passage for the tangs 84, 86, 88, 90 and passage for the connector 12.

Figure 5:
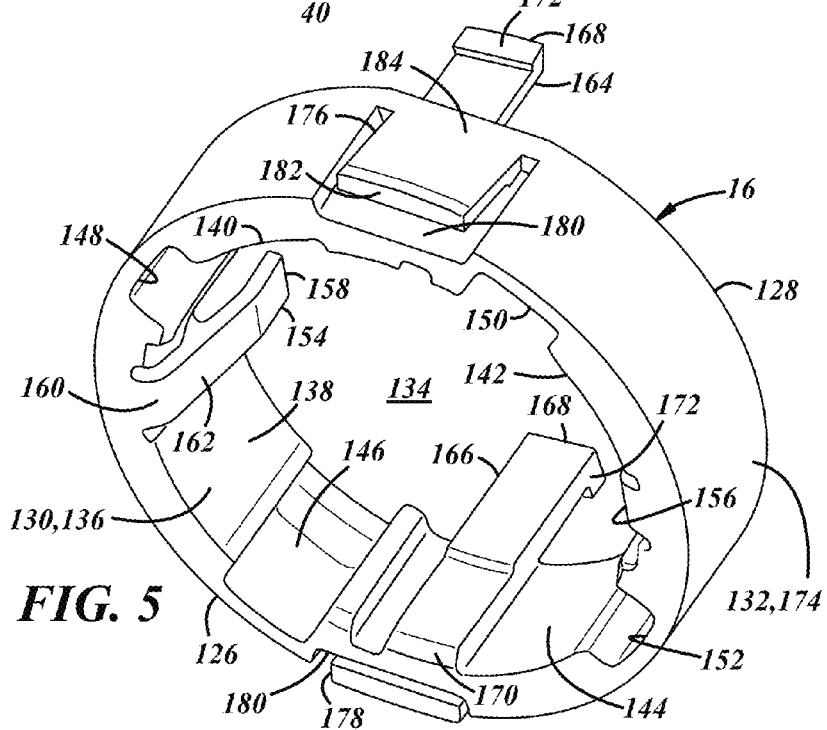
FIG. 5 is a perspective view, shown at a front, of an insert component of the fuel line connector assembly of FIG. 1.
Figure 6:
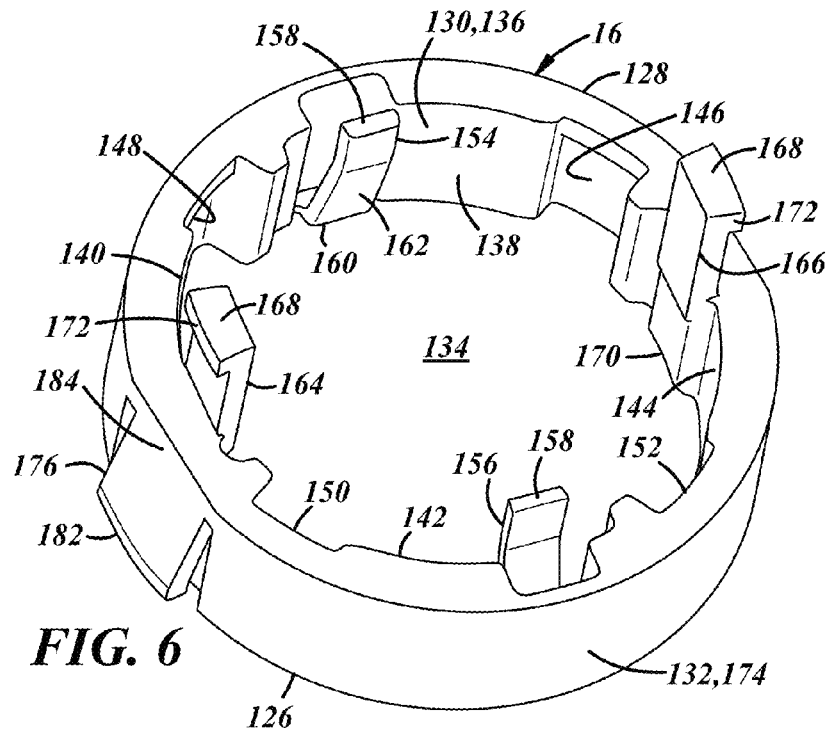
FIG. 6 is a perspective view, shown at a rear, of the insert component of FIG. 5.
Figure 7:
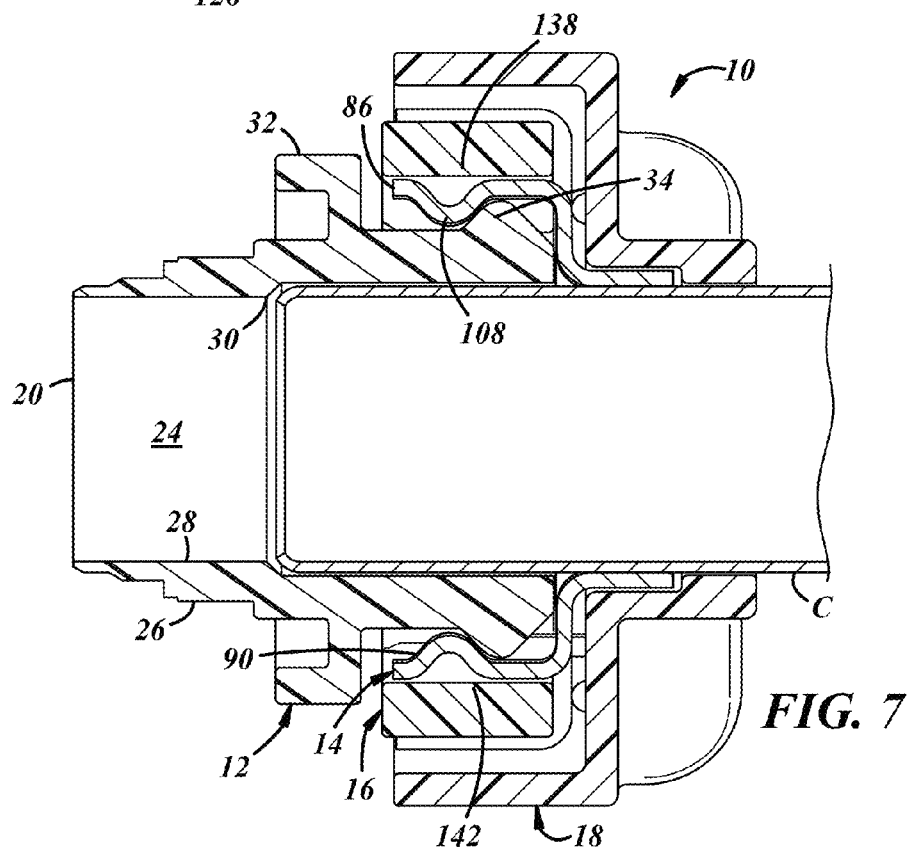
FIG. 7 is a sectional view taken at arrows 7-7 in FIG. 1.

On its inner surface 130 and on an inner wall 136, the insert 16 has several structures that interact in different ways with the connector 12, collar 14, and cover 18. Referring in particular to FIGS. 5 and 6, the insert 16 has keepers in the form of bulged portions, has projections, and has interconnectors in the form of extensions; in embodiments not shown in the figures, these parts could be provided single in number or in other quantities. When finally assembled together, the bulged portions hold down and maintain interaction and engagement between the flange 34 and the tangs 84, 86, 88, 90. There are a total of four bulged portions, one for each tang—a first bulged portion 138, a second bulged portion 140, a third bulged portion 142, and a fourth bulged portion 144. Like the tangs, the bulged portions are spaced around the circumference of the insert 16 approximately ninety degrees (90°) apart from one another. Each bulged portion 138, 140, 142, 144 is a radially-inwardly directed protrusion relative to a respective first clearance 146, second clearance 148, third clearance 150, and fourth clearance 152 located immediately adjacent the bulged portions. The bulged portions 138, 140, 142, 144 each have a circumferential extent that is greater than that of the tangs to facilitate interaction, though need not be; and each have an axial extent approximately equal to that of the tangs, again to facilitate interaction, though need not be.

Still referring to FIGS. 5 and 6, the projections are inserted into and through the third slot 66 and the fourth slot 68. There are a total of two projections spaced around the circumference of the insert 16 approximately one-hundred-and-eighty-degrees (180°) opposite each other—a first projection 154 and a second projection 156. Both of the first and second projections 154, 156 have a distal or free end 158, and an opposite proximal or attachment end 160. To facilitate interaction with the flange 34 and with the slots 66, 68, the projections are designed for slight radially-outward movement and flexing, but are resilient and rebound back to their original position after flexing. From their proximal to distal end 160, 158, each projection initially depends radially-inwardly from the inner wall 136 and then extends generally axially across a gap defined between the inner surface 130 and the projection. On their radially-inwardly facing side, each projection has a leading sloped surface 162 for easing abutment with the flange 34 during assembly of the fuel line connector assembly 10.

The extensions are inserted into and through the first slot 54 and the second slot 56. There are a total of two extensions spaced around the circumference of the insert 16 approximately one-hundred-and-eighty-degrees (180°) opposite each other—a first extension 164 and a second extension 166. Both of the first and second extensions 164, 166 have a distal or free end 168, and an opposite proximal or attachment end 170. A hooked portion 172 is located at each distal end 168 for engagement with the cover 18. The first and second extensions 164, 166 extend axially beyond the second axial end 128 of the insert 16 farther than the first and second projections 154, 156 so that the first and second extensions can be inserted through the slots 54, 56 and can reach farther into the cover 18.

On its outer surface 132 and on an outer wall 174, the insert 16 has a first tab 176 and a second tab 178, each one for reception through the respective first and second recesses 122, 124. As shown best in FIGS. 5 and 9, each tab has a generally planar and rectangular shape and is inset within a clearance 180 formed in the outer wall 174. A distal or free end 182 and a proximal or attachment end 184 of the first and second tabs are set inboard of the first and second axial ends 126, 128. Each tab is suspended and, at rest, is maintained at an angle relative to a radially underlying surface of the clearance 180 to define a gap 186 between the angled tab and the underlying surface. Particularly, the first and second tabs 176, 178 are slanted gradually radially-outward from their proximal ends 184 to their distal ends 182, and the radially-outwardly-most part of the tabs span beyond the outer wall 174. Due in part to the slant and the material in which they are made, the first and second tabs 176, 178 are capable of moving radially-inward and slightly flexing to close the gap 186 during use of the fuel line connector assembly 10, but are resilient and rebound back to their original position after flexing.

In full assembly, the cover 18 is located over the interacted and engaged parts of the connector 12, the collar 14, and the insert 16, and shields them from unwanted obstruction and snagging by external components of the larger fuel assembly. The cover 18 is also a component through which the assembler can connect the fuel line connector assembly 10 together and can disconnect the fuel line connector assembly and take it apart. The cover 18 can have different designs and constructions, including that shown by the embodiment of FIGS. 2, 3, and 9. Here, the cover 18 has a one-piece and generally cylindrical body. The cover 18 can be composed of a plastic material such as those commonly referred to as Nylon 12 and Nylon 6, and can be made by an injection molding process. The one-piece body extends axially between a first axial end 188 and a second axial end 190, and on its radially-inwardly side has an inner surface 192 and on its radially-outwardly side has an outer surface 194. In this embodiment the cover 18 has a first or axial wall 196, a second or radial wall 198, and a third or axial wall 200.

The first wall 196 extends generally axially, and depends axially and orthogonally relative to the second wall 198. On its inner surface side, the cover 18 has a step 202 formed in the first wall 196 and that defines a space with the metal conduit C for receiving the first wall 48 of the collar 14 and thereby provide relative overlap between the cover and the collar. A number of strengthening webs 204 in the shape of fins span between the first and second walls 196, 198 on the outer surface side, and bolster the structural integrity of the cover 18. An interconnector in the form of a first and second opening 206, 208 are defined in the first wall 196. The first and second openings 206, 208 receive the distal end portions of the respective first and second extensions 164, 166, and are particularly engaged by the hooked portions 172 of the first and second extensions. Each opening has an axial section defined in the second wall 198 and has a radial section defined in the first wall 196, as shown best in FIG. 9. An enclosure 210 is formed on each side of the first wall 196 at the first and second openings 206, 208 so that the hooked portions 172 of the first and second extensions 164, 166 are mostly surrounded and generally protected against being inadvertently snagged by external components of the larger fuel assembly after the hooked portions are inserted into the openings.

The second wall 198 extends generally radially, and depends radially and orthogonally relative to the first wall 196. A third and fourth opening 212, 214 are defined in the second wall 198 to serve as a window through which an assembler can peer when assembling the components of the fuel line connector assembly 10. In an embodiment with the openings 212, 214, indicia can be marked on the outer surface 46 of the collar 14 for viewing through the openings in order to provide an indication initially to the assembler, and subsequently to a quality inspector, of proper or improper rotational orientation among the components. For example, the indicia could include red and green markings—red indicating improper rotational orientation, and green indicating proper rotational orientation. Other indicia could include other coloring, or could include lettering or numbering markings.

The third wall 200 extends generally axially, and depends axially and orthogonally relative to the second wall 198. On its outer surface side, the third wall 200 has multiple gripping ribs 216 for gripping by an assembler's hand or by a suitable tool. An actuator in the form of a pair of press-down buttons 218 is provided at the third wall 200 through which an action can be initiated to disconnect the fuel line connector assembly 10—each press-down button for engagement with the respective and underlying tab 176, 178 of the insert 16. Each of the press-down buttons 218 is formed via a first or axial throughslot 220 and a second or circumferential throughslot 222, and is capable of moving radially-inward and slightly flexing during its press-down action but is resilient and rebounds back to its original position after flexing. In this embodiment, each of the press-down buttons 218 has a set of thumb grips 224 on its outer sides, and has a cam 226 on its inner sides for engaging the tabs 176, 178.

The components of the fuel line connector assembly 10 can be assembled together and installed in the accompanying larger fuel assembly in different ways, with different steps, and in different orders than described herein depending upon, among other considerations, the components provided and their design and construction. In the embodiment provided in the figures, for example, the collar 14 is attached and fixed to the metal conduit C at a desired axial position on the conduit. The insert 16 is brought together with the collar 14 via a generally axial direction and with the insert at a first circumferential orientation relative to the collar. The insert 16 generally fits within the collar 14 between the tangs 84, 86, 88, 90 and the third wall 52 and its wall segments 114, 116, 188, 120. In other words, the outer surface 102 of the tangs 84, 86, 88, 90 directly confronts the inner surface 130 of the insert 16, while the inner surface 44 at the third wall 52 directly confronts the outer surface 132 of the insert 16. In this way, there is a certain amount of sandwiching overlap between the collar 14 and the insert 16.

At the first circumferential orientation, the projections 154, 156 are inserted into the slots 66, 68 at the first sections 80 of the slots. Here, the projections 154, 156 are abuttingly engaged—and can be biased—against the lower edges 72 of the slots 66, 68, and are precluded and physically blocked from movement to the second sections 82 of the slots via the steps 78. In this way, the insert 16 is set and situated in the first circumferential orientation with respect to the collar 14. Also at this orientation, the extensions 164, 166 are inserted into the slots 54, 56, and the clearances 146, 148, 150, 152 are circumferentially aligned and radially overlie the respective tangs 84, 86, 88, 90. The bulged portions 138, 140, 142, 144 are misaligned with the tangs 84, 86, 88, 90 and the tangs are thereby free to flex radially-outward in the respective clearances 146, 148, 150, 152 as the tangs engage the flange 34 of the connector 12. Furthermore, the tabs 176, 178 are circumferentially misaligned with the respective recesses 122, 124, and are instead circumferentially aligned and radially overlaid by the unrecessed portions of the wall segments 114, 118. The tabs 176, 178 are therefore flexed radially-inward beneath the wall segments 114, 118 in the first circumferential orientation.

The cover 18 can now be fit over the insert 16 and collar 14. The cover 18 is brought over these components with its first and second openings 206, 208 circumferentially aligned and in-line with the first and second extensions 164, 166 of the insert 16. The hooked portions 172 are inserted into the first and second openings 206, 208, as shown in sectional profile in FIG. 9. The hooked portions 172 make abutting engagement with wall portions forming the enclosures 210 so that, once inserted, the cover 18 cannot be easily and inadvertently moved away from the insert 16. By this insertion, the cover 18 and insert 16 are united together for co-rotation whereby rotation of the cover causes rotation of the insert. The collar 14, insert 16, and cover 18 provide a pre-assembled assembly that is set on the metal conduit C and ready to receive the connector 12.

The connector 12 can then be brought together with the collar 14, insert 16, and cover 18 along a generally axial direction. The flange 34 engages the tangs 84, 86, 88, 90 and, amid their engagement, the leading surface 36 can make surface-to-surface abutment with the leading surface 110 as the tangs ride up over the flange. Once fully engaged, the trailing surfaces 38, 112 can make surface-to-surface abutment and establish an initial securement between the connector 12 and the collar 14—full engagement between the tangs and flange is shown in sectional profile in FIG. 7 (although in FIG. 7 the bulged portions are depicted overlying the tangs, which is not the case in the first circumferential orientation now being described). Concurrently as the connector 12 and insert 16 are brought together in the axial direction, the flange 34 abuttingly engages the leading surface 162 of the projections 154, 156. And upon full engagement, the projections 154, 156 are flexed radially-outward by the flange 34 and are lifted off of the lower edges 72 of the slots 66, 68—this full engagement is shown in sectional profile in FIG. 8. The projections 154, 156 are lifted above the steps 78 and are thus capable of moving unblocked from the first sections 80 to the second sections 82. In this embodiment, only once fully engaged can the cover 18 and insert 16 be rotated from the first circumferential orientation, as the steps 78 otherwise preclude rotation when the connector 12 is partially engaged because the projections 154, 156 would not have been lifted above the steps by the flange 34. The ability to rotate the cover 18 from the first circumferential orientation thereby provides a sort of feedback to the assembler that the connector 12 is fully engaged.

From the first circumferential orientation, the cover 18 and insert 16 can now be rotated clockwise or counterclockwise to a second circumferential orientation relative to the collar 14. To the second circumferential orientation, the projections 154, 156 are moved into the second sections 82 of the slots 66, 68, while the extensions 164, 166 are moved into equivalent second sections of the slots 54, 56. The tabs 176, 178 are also moved into and received in the respective recesses 122, 124. In different embodiments, several things can halt further rotation of the cover 18 and insert 16 in the second circumferential orientation. For example, abutting engagement between the first and second extensions 164, 166 and side edges of the first and second slots 54, 56, or reception of the tabs 176, 178 into the recesses 122, 124 can halt further rotation of the cover 18 and insert 16. These rotational positions can constitute the second circumferential orientation. Edge-to-edge abutment between the tabs 176, 178 and recesses 122, 124 precludes rotation back to the first circumferential orientation. Also at this orientation, the bulged portions 138, 140, 142, 144 are circumferentially aligned and radially overlie the respective tangs 84, 86, 88, 90. The bulged portions 138, 140, 142, 144 can make surface-to-surface abutting engagement with the tangs 84, 86, 88, 90 in order to hold down and keep the tangs over the flange 34—this is shown in sectional profile in FIG. 7. The abutting engagement precludes radially-outward flexing of the tangs 84, 86, 88, 90, and, in a sense, locks the securement between the connector 12 and collar 14.

To help ensure that the cover 18 and insert 16 are indeed co-rotated to the second circumferential orientation, and thus help ensure proper locking securement between the connector 12 and collar 14, the tab-and-recess reception action can be designed to provide a notice and indication to the assembler. For example, upon insertion, the tabs 176, 178 can snap into the recesses 122, 124 and against the overlying press-down buttons 218 and cams 226. The snapping action can emit an audible clicking sound that can be heard by the assembler. In addition to or instead of the clicking sound, upon insertion the tabs 176, 178 can abut against the press-down buttons 218 and cams 226 and displace the press-down buttons radially-outward. The displacement would then provide a visual indication and feel to the assembler of proper locking engagement. This can be in addition to the previously-described indicia marked on the outer surface 46 of the collar 14 for viewing through the openings 212, 214 of the cover 18, and in addition to the ability to rotate the cover 18 from the first circumferential orientation.

In the embodiment of the figures, the components of the fuel line connector assembly 10 can be disassembled in order to disconnect the accompanying fuel lines. Referring to FIG. 9, the assembler depresses the press-down buttons 218 and the cams 226 in turn push down the underlying tabs 176, 178 and close the gaps 186 defined underneath the tabs. Once the tabs 176, 178 are past and clear of the edges of the recesses 122, 124, the cover 18 and the insert 16 can be rotated back to the first circumferential orientation. The bulged portions 138, 140, 142, 144 are once again misaligned with the tangs 84, 86, 88, 90 in the first circumferential orientation. The connector 12 can then be pulled away from the collar 14, insert 16, and cover 18 as the tangs 84, 86, 88, 90 are free to radially-outward flex in the respective clearances 146, 148, 150, 152.

In other embodiments not shown in the figures, the interconnectors of the different components could be swapped and exchanged among one another. For example, the interconnector of the connector 12 could be provided in the form of tangs while the interconnector of the collar 14 could be provided in the form of a flange. Similarly, the interconnector of the insert 16 could be provided in the form of openings, while the interconnector of the cover could be provided in the form of extensions. Other examples are possible for the components.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A fuel line connector assembly, comprising:
a connector having a first interconnector;
a collar constructed for attachment to a conduit of a fuel line assembly, said collar having a second interconnector; and
an insert having a keeper;
a cover having a third interconnector;
wherein, said connector, collar, insert and cover are connectable together such that said first interconnector of said connector and said second interconnector of said collar engage each other along a generally axial direction and secure said connector and said collar together, and the cover third interconnector and a fourth interconnector of the insert engage each other along a generally axial direction and secure the insert and cover together and, upon circumferential rotation of said insert, said keeper interacts with said first and second interconnectors and holds their engagement and maintains securement between said connector and said collar.

2. A fuel line connector assembly as defined in claim 1, wherein said first interconnector is a flange and said second interconnector is a tang, and said tang and said flange make surface-to-surface abutment when engaged and secured.

3. A fuel line connector assembly as defined in claim 1, wherein said keeper is a bulged portion extending radially-inwardly from a wall of said insert, and said bulged portion abuts said second interconnector of said collar upon their interaction.

4. A fuel line connector assembly as defined in claim 1, further comprising a cover having a third interconnector, wherein said collar has a slot with a step located in an edge of said slot, said insert has a projection;
wherein, when said insert and said cover are brought together along the generally axial direction, said third interconnector and said fourth interconnector engage each other and join rotational movement of said insert and said cover, and said projection of said insert is inserted through said slot of said collar; and
wherein engagement between said projection and said step of said slot precludes circumferential rotation of said insert and said cover.

5. A fuel line connector assembly of claim 4, wherein engagement between said first interconnector of said connector and said projection of said insert permits movement of said projection past said step and circumferential rotation of said insert and said cover is not precluded.

6. A fuel line connector assembly, comprising:
a connector having a first interconnector;
a collar having a second interconnector and a slot located in a wall of said collar; and
an insert having a projection;
wherein, said connector, collar, and insert are connectable together along a generally axial direction such that said first interconnector of said connector and said second interconnector of said collar interact to secure said connector and said collar together, and, when said insert is at a first circumferential orientation relative to said collar and is brought into engagement with said collar along the generally axial direction, said projection is inserted through said slot at a first section of said slot, and upon rotation of said insert to a second circumferential orientation relative to said collar, said projection is moved to a second section of said slot.

7. A fuel line connector assembly, comprising:
a collar constructed for attachment to a conduit of a fuel line assembly, said collar having a slot located in a wall and a recess;
an insert having a projection, a first interconnector, and a tab; and
a cover having a second interconnector and an actuator;
wherein, when said insert is at a first circumferential orientation relative to said collar, and said collar, insert, and cover are brought together along a generally axial direction, i) said projection is inserted through said slot of said collar, and ii) said first interconnector of said insert and said second interconnector of said cover engage each other;
wherein, when said cover is thereafter rotated to a second circumferential orientation relative to said collar, said insert co-rotates with said cover to the second circumferential orientation via engagement between said first and second interconnectors;
wherein, with said insert and said cover at the second circumferential orientation, said tab of said insert is received in said recess of said collar and said insert is inhibited from circumferential rotation away from the second circumferential orientation via said tab and said recess;
wherein, in order to bring said insert and said cover out of the second circumferential orientation, said actuator of said cover is actuated and moves said tab of said insert out of said recess of said collar.

8. A fuel line connector assembly as defined in claim 7, wherein said first interconnector of said insert is an extension and said second interconnector of said cover is an opening, and said extension is insertable into said opening upon engagement.

9. A fuel line connector assembly, comprising:
a connector having a flange;
a collar constructed for attachment to a conduit of a fuel line assembly, said collar having a tang, having a first wall with a slot located therein, and having a second wall with a recess located therein;
a insert having an extension, a bulged portion, and a tab; and
a cover having an opening and an actuator;
wherein, when said connector, said collar, said insert, and said cover are brought together along a generally axial direction, i) said flange of said connector and said tang of said collar engage each other and secure said connector and said collar together, ii) said extension of said insert is inserted through said slot of said collar, and iii) said extension is received in said opening of said cover;
wherein, when said cover is circumferentially rotated, i) said insert co-rotates with said cover via reception of said extension in said opening, ii) said bulged portion of said insert abuts said tang of said collar and holds its engagement with said flange of said connector and inhibits axial separation of said collar and said connector away from each other, and iii) said tab of said insert is received in said recess of said collar and said insert and said collar are inhibited from further circumferential rotation relative to each other;
wherein, in order to permit further circumferential rotation of said cover and said insert, said actuator of said cover can be actuated to move said tab of said insert out of said recess of said collar.

10. A fuel line connector assembly as defined in claim 9, wherein said collar has a second slot located in said first wall and said insert has a projection, and when said collar and said insert are brought together generally axially before circumferential rotation of said cover, said projection is inserted through said second slot at a first section of said second slot and said insert is set at a circumferential orientation relative to said collar that facilitates engagement between said flange and said tang free of abutment with said bulged portion, wherein, when said connector and said insert are brought together generally axially, said flange and said projection engage each other and movement of said projection from said first section of said second slot is facilitated via the engagement, and wherein, upon circumferential rotation of said cover, said projection is moved to a second section of said second slot.

* * * * *